United States Patent [19]

Kuchar

[11] Patent Number: 4,796,645
[45] Date of Patent: Jan. 10, 1989

[54] CYLINDER FOR COMBINE

[76] Inventor: George J. Kuchar, 939 Charles, P.O. Box 595, Carlinville, Ill. 62626

[21] Appl. No.: 107,556

[22] Filed: Oct. 13, 1987

[51] Int. Cl.$^4$ ............................................. A01F 12/18
[52] U.S. Cl. .............................. 130/27 HA; 130/27 H
[58] Field of Search ............. 130/27 H, 27 HA, 27 R; 56/14.6

[56] References Cited

U.S. PATENT DOCUMENTS 3,203,428 8/1965 Ausherman .................... 130/27 HA
3,927,679 12/1975 Ausherman .................... 130/27 HA

*Primary Examiner*—Stephen F. Husar
*Attorney, Agent, or Firm*—Emrich & Dithmar

[57] ABSTRACT

A rotating solid cylinder is used with a complementary concave in a combine to separate grain from the leafy portion of the plant. The solid cylinder has a plurality of raspbars spaced about its periphery and extending the length thereof, while the fixed concave similarly has a plurality of spaced, lengthwise bars in spaced relation from the raspbars of the cylinder as it rotates. The raspbars are positioned outward from and parallel to the convex surface of the cylinder such that the cylinder assembly has a generally star-shaped cross section with the raspbars located at the tips of the star. A curved filler plate coupled to each of the raspbars substantially fills in the gap between adjacent raspbars. The increased mass and inertia of the solid cylinder requires less power to maintain its rotation and allows the cylinder to be rotated more slowly resulting in less damage to the grain. The cylinder's solid structure also prevents soil and debris from entering the cylinder in avoiding out of balance operation of the cylinder, while the curved filler plates provide improved grain engagement and displacement thus increasing the combine's grain handling capacity. In another embodiment, the cylinder is comprised of a plurality of star-shaped hubs in spaced relation along its length and further includes a plurality of raspbars disposed about and mounted to each hub at the tips of each of the stars with a filler plate disposed between adjacent raspbars.

15 Claims, 3 Drawing Sheets

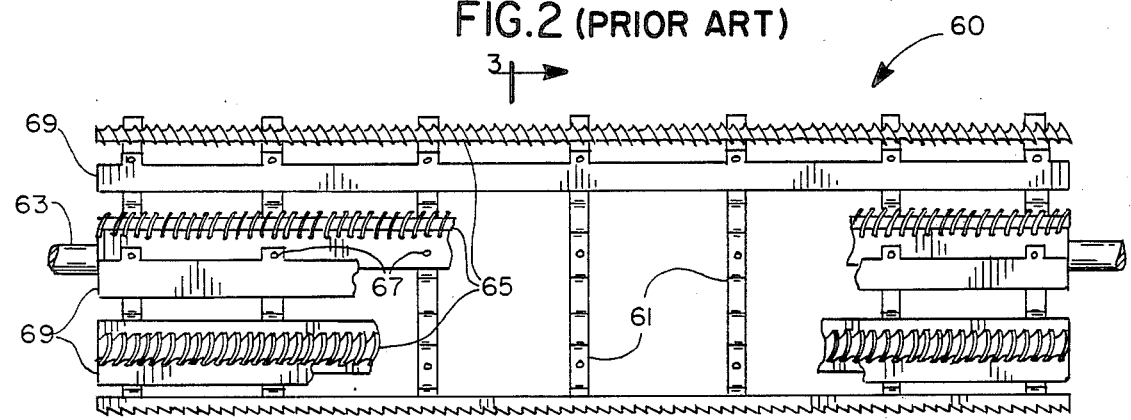
FIG. 2 (PRIOR ART)
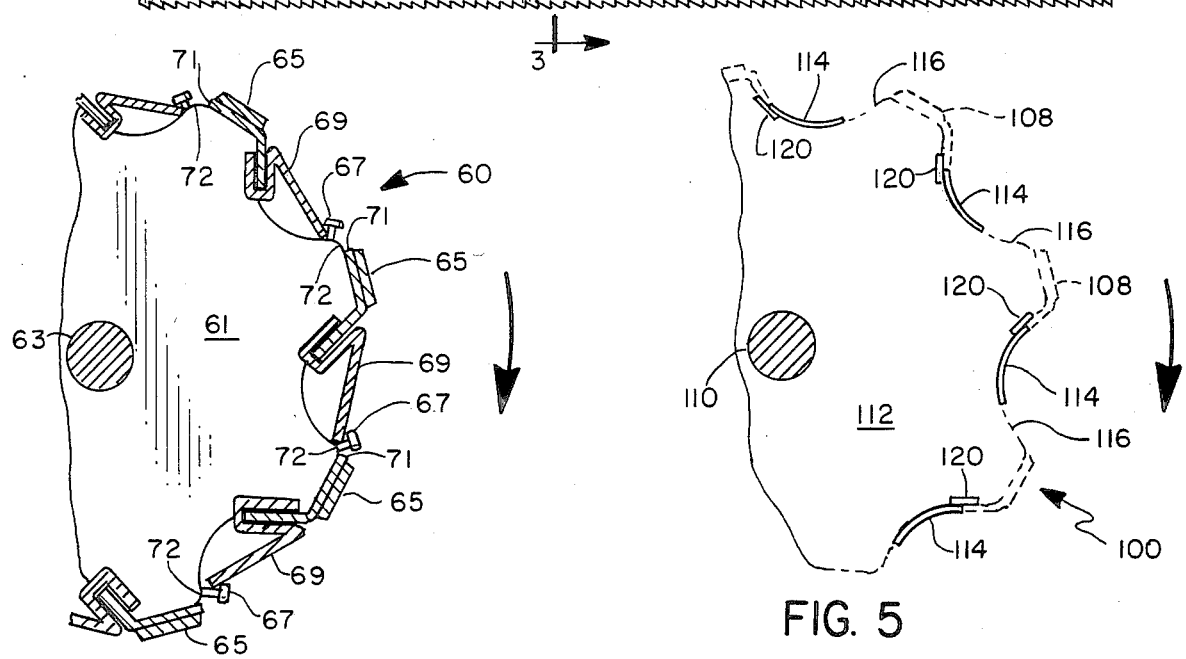
FIG. 3 (PRIOR ART)
FIG. 5
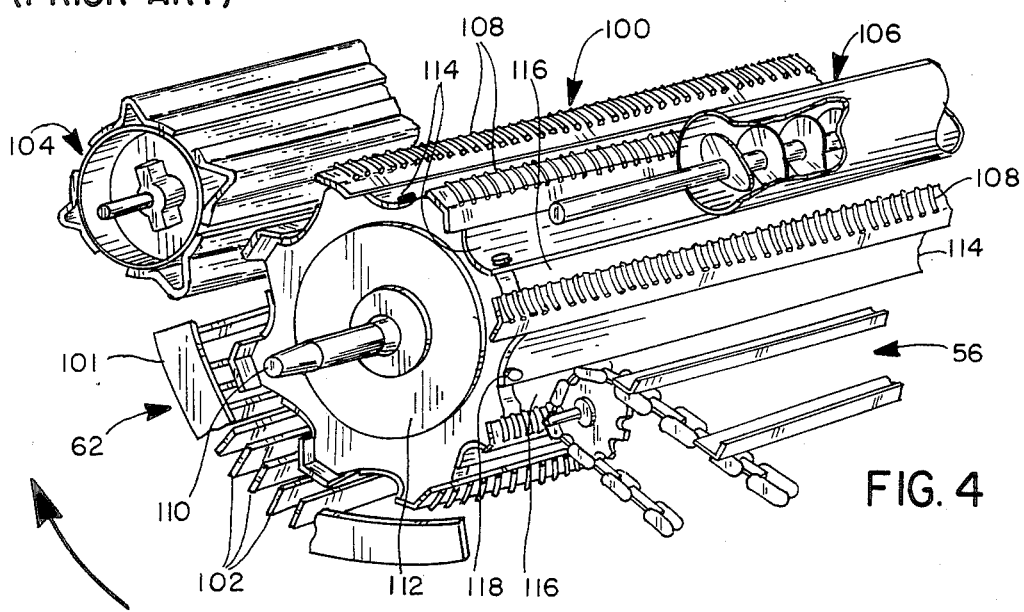
FIG. 4

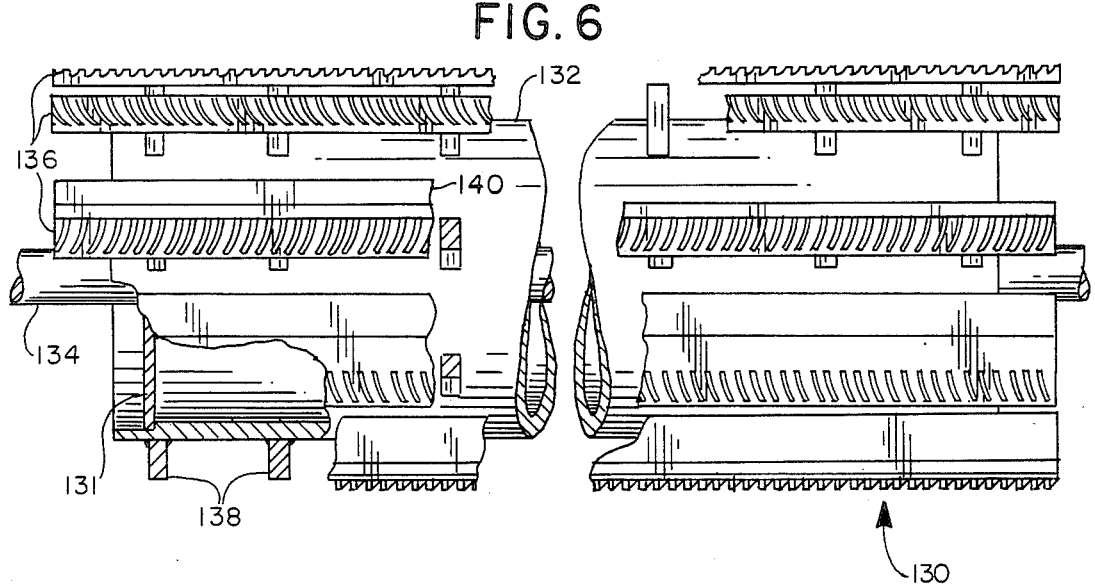
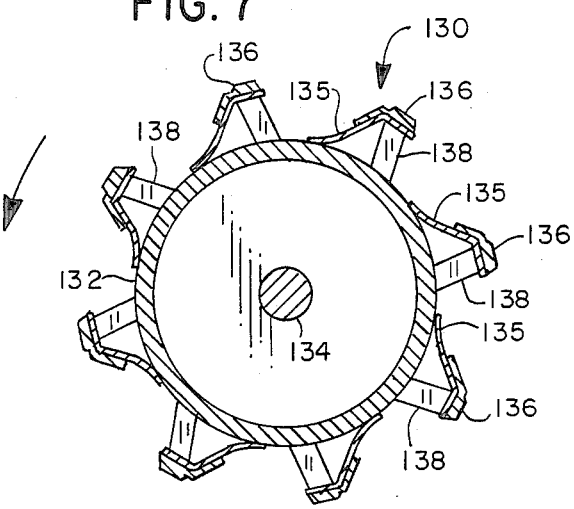
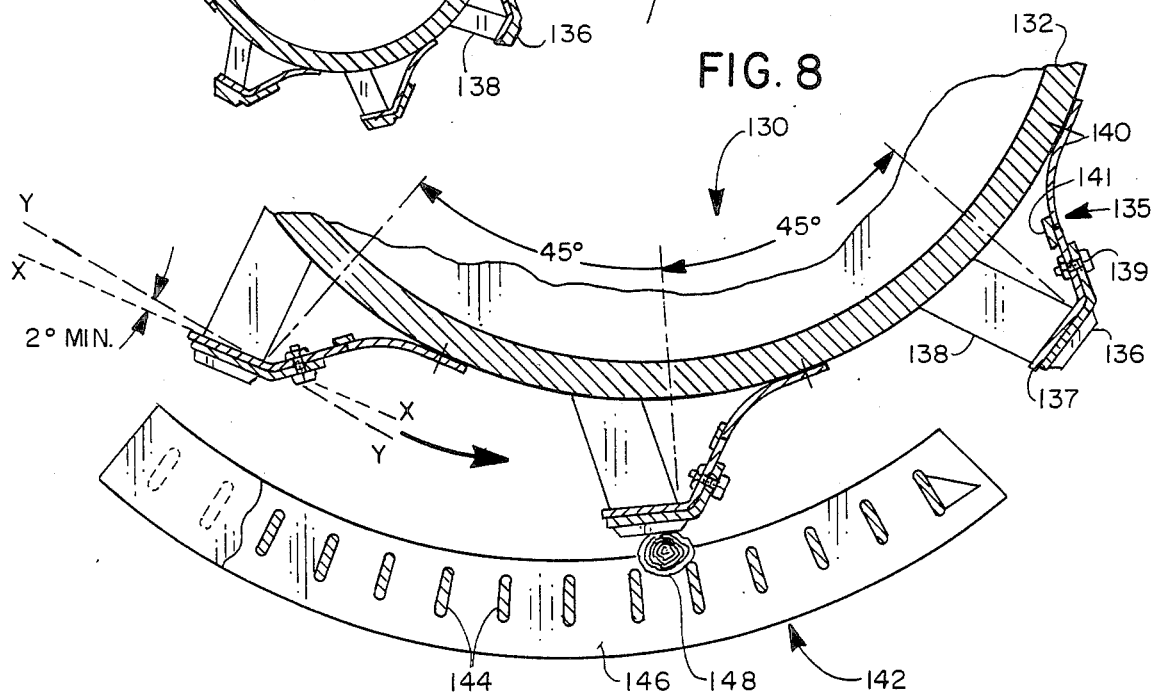

CYLINDER FOR COMBINE

BACKGROUND OF THE INVENTION

This invention relates generally to agricultural combines used in the harvesting of crops and is particularly directed to a cylinder for use in a combine in separating grain from plant residue.

A combine is an agricultural vehicle used in the harvesting of crops. The combine is typically self-propelled and is comprised of a forward header assembly and an aft drive and processing section. The header assembly typically is substantially wider than the aft portion of the combine and includes a plurality of spaced corn or row crop heads which are adapted for engaging the crops in removing the grain therefrom. The thus removed grain, in combination with crop residue such as husks in the case of corn harvesting, are then automatically delivered to the aft processing and drive portion of the combine. In addition to housing the source of propulsion, such as a diesel engine, and operator controls, the aft portion of the combine also includes a complicated threshing system for further separating the grain from the crop residue and for off-loading the thus separated grain from the combine into a transport vehicle such as a truck. The crop residue is then exhausted from an aft portion of the combine and deposited in the field being harvested.

Combines typically make use of a rotating cylinder in the early stages of grain-crop residue separation. The cylinder is typically oriented horizontally and transversely to the direction of combine travel and is adapted to receive that portion of the crop which is separated from the plant by the forward header assembly. The rotating cylinder operates in cooperation with a concave structure positioned adjacent to and below the cylinder. The cylinder-concave combination operates to separate the grain from the husk or leafy portion of the plant. The cylinder includes a first plurality of spaced raspbars around the periphery and extending the length thereof, while the concave includes a second plurality of spaced bars generally parallel to the raspbars. The crop is directed to the space between the rotating cylinder and the concave and the action of the rotating cylinder upon the crop as it is engaged by both the rotating cylinder and concave causes the grain bearing portion of the plant, i.e., the cob in corn harvesting, to become separated from the remaining portion of the plant, i.e., the leafy portion. The grain is then subjected to additional processing for further separation, while the crop residue is exhausted from the combine.

In the prior art, various problems have been encountered as the grain transits the cylinder-concave portion of the combine. For example, the impact of the cylinder upon the plant frequently results in cracking of the grain making the grain more susceptible to deterioration by moisture and attack by pests such as insects. In addition, debris such as crop residue and soil ingested by the combine is frequently deposited in and retained by the rotating cylinder. As the mass of this debris increases, out of balance operation of the cylinder occurs resulting in irregular engagement of the crop by the cylinder and degraded grain separation. Rotation of the cylinder in this out of balance condition also requires the combine operator to interrupt operation and clean out the debris within the cylinder. This condition also causes increased wear on the cylinder's bearings resulting in reduced combine reliability.

The present invention overcomes these and other limitations of the prior art by providing a solid cylinder in one embodiment, and a substantially solid, continuous cylinder in another embodiment, for use in a combine in separating grain from the remaining portion of the plant which reduces grain damage arising from impact with the cylinder, prevents cylinder out of balance operation, affords more reliable combine operation and provides increased grain handling capacity.

OBJECTS AND SUMMARY OF THE INVENTION

Accordingly, it is an object of the present invention to provide an improved cylinder for use in a combine in separating grain from plant residue.

It is another object of the present invention to increase the fuel efficiency of a combine by facilitating the rotation of a cylinder used for separating grain from the remaining portion of the plant in the combine.

Another object of the present invention is to reduce grain damage in a combine by operating a rotating grain separating cylinder at reduced speed.

A further object of the present invention is to eliminate interruptions in the operation of a combine arising from the accumulation of debris in the combine's grain separating cylinder.

A still further object of the present invention is to provide increased operating reliability and grain separating capacity in a combine.

This invention contemplates a rotating cylinder for use in combination with a complementary concave in a combine which provides improved separation of grain from the leafy portion of the plant during harvesting. The rotating cylinder of the present invention includes a plurality of spaced raspbars around the periphery of the cylinder which extend substantially the length thereof. Disposed between adjacent raspbars and mounted to one of the adjacent raspbars is a curved filler plate. Each of the curved filler plates is concave in a direction outward from the cylinder and is positioned in front of the raspbar to which it is connected as the cylinder is rotationally displaced. Each of the curved filler plates substantially fills the gap between adjacent raspbars which, in combination with the curved shape of the filler plates, prevents crop residue and soil from entering the cylinder and causing it to operate in an out of balance condition. The filler plates also provide improved grain engagement and displacement thus increasing the combine's grain handling capacity. In one embodiment, the cylinder assembly includes a solid cylinder wherein the raspbar/filler plate combinations are disposed in a spaced manner about the circumference of the solid cylinder. The cylinder's solid structure also prevents soil and plant debris from entering the cylinder in avoiding out of balance operation of the cylinder, while the increased mass and inertia of the solid cylinder requires less power to maintain its rotation imposing less of a load on the combine and allows the cylinder to be rotated more slowly resulting in less damage in the form of cracking to the separated grain.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is a planar view of a prior art cylinder;

FIG. 3 is a partial sectional view of the prior art combine cylinder illustrated in FIG. 2 taken along sight line 3—3 therein;

FIG. 4 is a perspective view of a cylinder for use in a combine in accordance with the present invention;

FIG. 5 is a partial sectional view of the combine cylinder illustrated in FIG. 4 taken along the cylinder's longitudinal axis;

FIG. 6 is a partially cutaway planar view of another embodiment of a combine cylinder employing curved filler plates in accordance with the present invention;

FIG. 7 is a sectional view of the combine cylinder illustrated in FIG. 6 taken along the longitudinal axis of the cylinder; and FIG. 8 is a partial sectional view of the combine cylinder shown in FIG. 7 illustrating additional details thereof and the manner in which the cylinder cooperates with the combine's concave in the grain separation process.

DETAILED DESCRIPTION OF THE PREFERRED EMBODIMENTS

Figure 1:
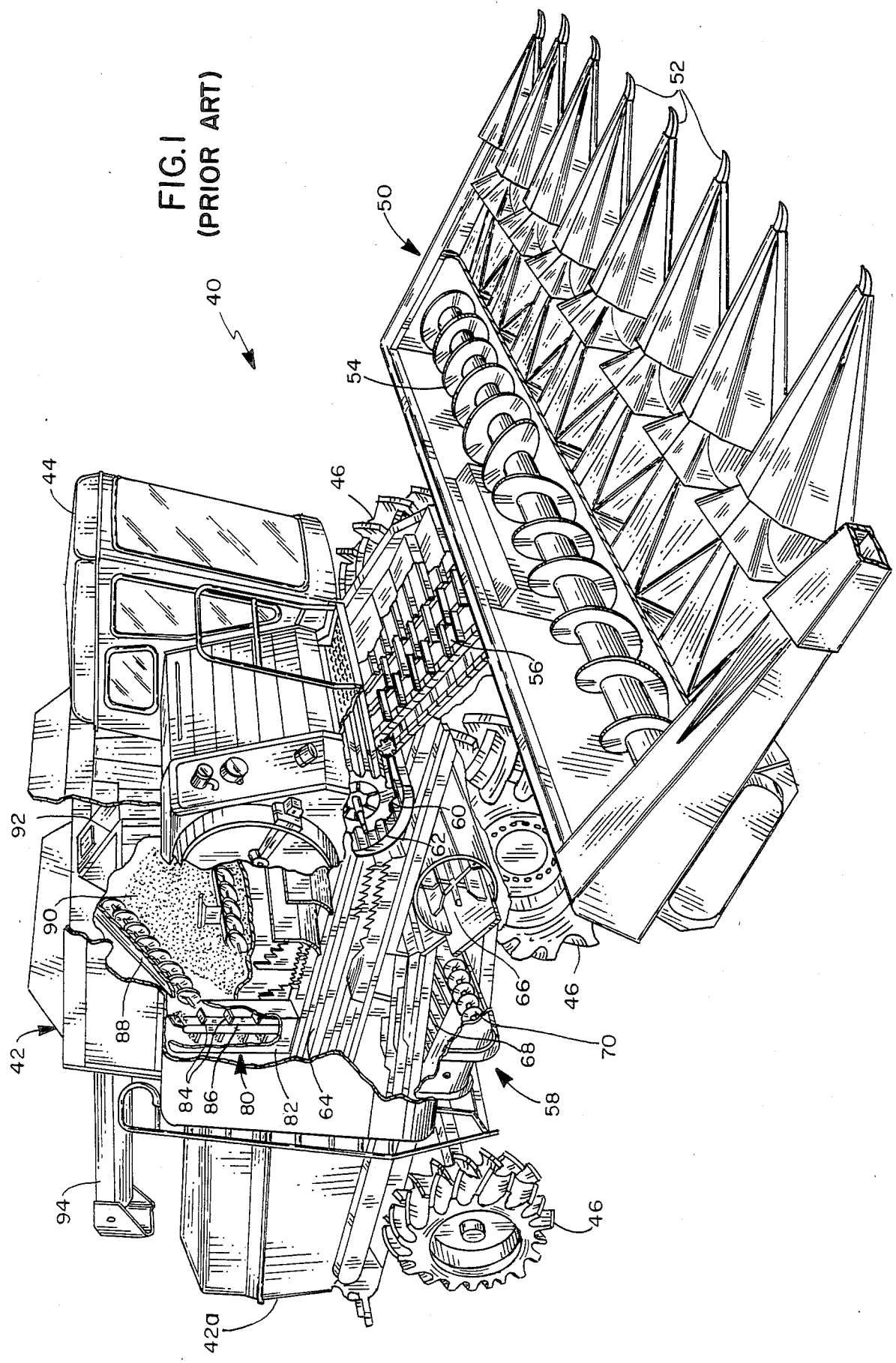
FIG. 1 is a partially cutaway perspective view of a combine illustrating the manner in which the improved cylinder of the present invention is intended for use in a conventional combine.

Referring to FIG. 1, there is shown a partially cutaway perspective view of a typical combine 40 which incorporates a prior art cylinder 60. The combine 40 is comprised primarily of an aft separator/drive section 42 and a forward header assembly 50 attached to a forward portion of the separator/drive section. The separator/drive section 42 includes a cab 44 in which an operator sits and in which are positioned various operating controls for the combine. The separator/drive section 42 effects separation of the grain from the crop residue and includes a plurality of wheels 46 as well as a means for propulsion (typically a diesel engine which is not shown for simplicity) for moving the combine 40 through a field in harvesting the crops. The separator/drive section 42 includes an aft or exhaust end 42a from which the crop residue, after the grain is separated therefrom, is exhausted from the combine 40 and deposited in the field being harvested.

The header assembly 50 mounted to a forward portion of the separator/drive section 42 is wider than the separator/drive section and includes a plurality of head units extending along the length thereof, such as the corn heads 52 illustrated in FIG. 1. The header assembly 50 may also be provided with a plurality of spaced row crop heads along the length thereof for harvesting soybeans, wheat, milo or rice. The corn heads 52 are adapted to separate and remove the ears of corn from the plant stalk. The grain and the plant residue is then delivered to an aft portion of the header assembly 50 and is directed to the center thereof by means of a left- and right-hand spiraled auger 54. From the center, aft portion of the header assembly 50, the grain and residue mixture is delivered to a feeder house 56 which transports the mixture to the combination of a rotating cylinder drum 60 and a concave screen 62. The cylinder drum 60 includes a plurality of spaced raspbars extending along the length and spaced around the periphery thereof. Rotation of the cylinder drum 60 causes the raspbars to engage the corn husks and separate the cob from the leafy portion of the plant. A beater assembly, which is not shown in the figure, is typically positioned immediately aft of the cylinder drum 60 and concave screen 62 combination for further carrying out the separation process. The beater assembly deposits the reduced mixture upon an elongated walker assembly 64 which is comprised of a plurality of vibrating sieves. The separated grain is allowed to fall through the vibrating sieves of the walker assembly 64, while the unwanted plant residue is retained on an upper portion of the walker assembly and displaced toward the rear of the combine. The thus separated grain which falls through the vibrating sieves of the walker assembly 64 is deposited upon a cleaning shoe 68 positioned below the walker assembly and comprised of a grate structure for further separating the grain from any crop residue remaining in the mixture. As the grain and residue mixture falls upon the cleaning shoe 68, a blower 66 directs an air stream on the falling mixture to remove chaff therefrom. The chaff and other crop residue removed from the mixture in the earlier separation steps are discharged from the aft or exhaust end 42a of the combine 40. The thus cleaned grain collects in a lower portion of the separator section 58 of the combine and is laterally displaced by means of a rotating clean grain auger 70 to a center portion of the combine.

The clean grain auger 70 is coupled to and continuous with a generally vertically oriented grain elevator 80. The grain elevator 80 includes a housing 82 within which is positioned a plurality of paddle 84 attached to a moving endless chain 86. The grain elevator 80 lifts individual portions of grain upward where the grain 90 is then displaced by a loading auger 88 into a storage bin or tank 92. One end of an off-loading grain drill 94 may be positioned within the storage tank 92 for removing the grain positioned therein from the combine 40.

Referring to FIG. 2, there is shown a planar view of a prior art cylinder 60 which the present invention is intended to replace. FIG. 3 is a partial sectional view of the prior art cylinder 60 illustrated in FIG. 2 taken along sight line 3—3 therein. The prior art cylinder 60 includes a plurality of spaced hubs, or spiders, 61 disposed along its length. Each of the hubs 61 includes a plurality of upraised and recessed peripheral portions which are disposed in an alternating manner around the periphery of the hub. Each of the hubs 61 further includes an aperture in its center through which an axle, or support shaft, 63 extends. The axle 63 interconnects all of the spaced hubs 61 so as to form a unitary structure in which all of the hubs rotate about the axle in unison. Also coupled to each of the hubs 61 along the length of the cylinder 60 are a plurality of spaced raspbars 65. Each of the raspbars 65 is securely mounted to an upraised portion on the periphery of the hubs 61 along the length of the cylinder 60. A respective mounting bracket 71 couples each of the raspbars 65 to an upraised portion on the periphery of each of the hubs 61. As the cylinder 60 rotates in the direction of the arrow in FIG. 3, the crop being harvested is engaged by the rotating raspbars 61 of the cylinder 60 and is thus directed into the concave, which is not shown in FIGS. 2 and 3 for simplicity. Engagement of the crop material between the rotating raspbars 65 and the concave causes the grain bearing portion of the plant to be separated from the husk portion thereof.

Disposed between each of the raspbars 65 is a filler plate 69. Each of the filler plates 69 is mounted to an adjacent mounting bracket 71 by means of a respective mounting bolt 67. The filler plates 69 disposed between adjacent raspbars 65 fill up a portion of the gap between adjacent raspbars along the length of the cylinder 60. Each of the filler plates 69 is provided with a substantially flat, upraised portion which bridges most of the space between adjacent raspbars 65. However, there is a gap 72 between each filler plate 69 and an adjacent raspbar 65. This gap 72 is on the order of 1¼" in prior art cylinders. The rotating action of the cylinder 60 causes debris such as soil and plant residue ingested by the combine to pass through these inter-raspbar/filler plate gaps 72 and to accumulate within the cylinder. Over a period of time, accumulation of this residue within the cylinder 60 results in an unbalanced condition in the cylinder as it rotates causing excessive wear to bearings (not shown) which support the cylinder's axle 63 and reducing combine reliability. When this condition becomes too severe, the combine operator must interrupt operation, gain access to the cylinder which is positioned within the combine, and attempt to empty the cylinder of this residue. This is a time consuming and tedious task which substantially reduces harvesting efficiency.

Referring to FIG. 4, there is shown a perspective view of an improved cylinder 100 in accordance with the principles of the present invention. A partial sectional view of the cylinder 100 is illustrated in FIG. 5. The cylinder 100 is illustrated in FIG. 4 in combination with a concave 62 positioned immediately below the cylinder and comprised of a pair of curved end brackets 101 (only one of which is shown in FIG. 4 for simplicity) and a plurality of spaced bars 102 extending along the length thereof. As previously described, the combination of the rotating cylinder 100 and the concave 62 effects separation of the grain from the leafy, or husk, portion of the plant. Disposed immediately forward of the cylinder 100 is a conveyor-type feeder assembly 56 which delivers the crop directly between the cylinder 100 and the open-mouth concave 62 as the cylinder rotates in the direction of the arrow in FIG. 4. Disposed immediately aft of the cylinder 100 is a rotating beater assembly 104 which displaces the grain and crop material from the cylinder/concave combination for further separation of the grain from the crop residue. An auger 106 disposed above and slightly forward of the cylinder 100 returns unthreshed grain which reaches the back of the cleaning area to the cylinder area for another pass between the cylinder 100 and the concave 62.

The improved cylinder 100 includes a plurality of hubs, or spiders, 112 disposed in a spaced manner along the length thereof and coupled by means of an axle, or support shaft, 110 inserted through a center of each of the hubs. Each of the hubs includes a plurality of spaced, upraised peripheral portions upon which are mounted raspbars 108 which extend substantially the entire length of the cylinder 100. The raspbars are illustrated in dotted line form in FIG. 5 for simplicity. Each of the raspbars 108 is securely mounted to an upraised peripheral portion of each of the hubs 112 in a spaced manner by conventional means such as mounting bolts or the combination of a mounting bracket and bolt, which are not shown for simplicity.

Positioned immediately adjacent to and attached to each of the raspbars 108 along the length thereof is a respective spacer or filler plate 114. Each of the filler plates 114 extends over a portion of the gap or space between adjacent raspbars 108 and is disposed over substantially the entire length of the cylinder 100 and has a curved cross section. The filler plates 114 may be securely coupled to each of the hubs 112 by conventional means such as bolts 118 as shown in FIG. 4. In a preferred embodiment, each of the filler plates 114 is further coupled to its immediately adjacent raspbar 108 by means of a plurality of welded mounting clips 120. The curvature of each of the filler plates 14 conforms with the recessed peripheral portion of the hubs 112 and the width of each of the filler plates is such as to extend only over a portion of the space between adjacent raspbars 108 leaving a gap 116 between each filler plate and the adjacent raspbar to which it is not attached. In a preferred embodiment, a three inch gap 116 is provided between each filler plate 114 and the adjacent raspbar 108 to which it is not attached.

The curvature of the filler plates 114 and the turbulence caused by their rotational displacement produces an area of reduced pressure positioned immediately adjacent to the concave outer surface of each of the filler plates. This area of reduced pressure cause the dust and debris from the soil and crop residue to be sucked out of the interior of the cylinder 18 preventing it from becoming unbalanced. The curved shape of the filler plates 114 also exerts a cupping action upon the grain providing the rotating cylinder 100 with an increased engagement of and retention capacity for the grain as the cylinder rotates. The improved cylinder 100 of the present invention is thus capable of transporting an increased volume of grain over that previously available. The curved shaped of the filler plates also causes the grain to be transported by and through the cylinder section more quickly, thus subjecting the grain to reduced impact with either the rotating cylinder or the concave 62. Reduced contact of the grain with the rotating cylinder 100 and the concave 62 results in a decrease in the crack or damage done to the grain during processing within the combine. The curved filler plates 114 of the present invention thus prevent the accumulation of debris within the rotating cylinder and eliminate the possibility of its out of balance operation, transport the grain more quickly with less contact through the combine's cylinder section causing less damage to the grain, and afford a greater grain tranport capacity.

Referring to FIG. 6, there is shown a partially cutaway planar view of another embodiment of a cylinder 130 for use in a combine in accordance with the principles of the present invention. The cylinder 130 includes a solid cylindrical body 132 having a generally circular hub 131 on each end thereof. Each of the end hubs 131 has an aperture therein through which an axle 134 is inserted for supporting and permitting rotational displacement of the cylinder 130. A sectional view of the cylinder 130 illustrated in FIG. 6 taken along the longitudinal axis of the cylinder is shown in FIG. 7.

Disposed in a spaced manner around the circular circumference of the solid cylindrical body 132 and extending substantially the length thereof are a plurality of support brackets 138. A linear array of spaced support brackets 138 is coupled to and provides support for each of a plurality of elongated, linear raspbars 136 along the length of the cylindrical body 132. A plurality of raspbars 136 are thus disposed around the circumference of the solid cylindrical body 132 in a spaced manner and extend substantially the entire length of the cylinder 130. Coupled to each of the raspbars 136 is a curved filler plate 135. Each of the filler plates 135 includes a concave portion directed outward from the solid cylindrical body 132 and positioned forward of its associated raspbar 136 as the cylinder 130 rotates in the direction of the arrows shown in FIG. 7.

Referring to FIG. 8, there is illustrated a partial sectional view of the combination of the solid cylinder 130 and a complementary concave 142 illustrating additional details of the invention. As previously described, the concave 142 includes a plurality of bars 144 coupled to and extending between a plurality of curved brackets 146. In the arrangement of FIG. 8, each of the curved filler plates 135 is coupled in a conventional manner such as by welding to a respective support bracket 138 and to the outer surface of the cylindrical body 132. Each of the curved filler plates 135 is comprised of an outer bracket portion 137 and an inner bracket portion 140. The outer bracket portion 137 is securely affixed to the support bracket 138. The inner bracket portion 140 is continuous with the outer bracket portion 137 and is attached thereto by means of a mounting clip 141 and may also be welded or bolted to the cylindrical body's outer surface. A raspbar 136 is mounted to an outer bracket portion 137 of each curved filler plate 135 also by conventional means such as a nut and bolt combination 139. Each of the raspbar/filler plate combinations is disposed about the circumference of the solid cylindrical body 132 at 45° spaced intervals. In addition, there is an angle of at least 2° between the plane of the raspbar 136 represented by the line X—X in FIG. 8 and a plane tangent to the solid cylindrical body 132 adjacent to the position of the raspbar thereon indicated by the line Y—Y in the figure. Thus, the leading edge of the raspbar 136 is displaced further from the concave 142 than its trailing edge as the cylinder 130 rotates in the direction of the arrow shown in FIG. 8. It should also be noted in FIG. 8 that the rotating cylinder 130 and the concave 142 are off-center relative to one another such that as each raspbar 136 is displaced over the concave, the raspbar moves closer to the concave. Thus, displacement between each raspbar 136 and the concave 142 becomes progressively smaller as the raspbar is displaced over the concave. This affords gradual and increasing confinement and engagement of each corncob 148 as the raspbar 136 moves along the concave 142. This reduces impact damage to the kernals of corn on the corncob 148 due to impact with the raspbars 136 or upon becoming wedged between the moving raspbar and the concave 142.

As in the earlier embodiment described above, each of the curved filler plates 135 has a concave outer portion which exerts a cupping action upon the grain providing the rotating cylinder 130 with increased engagement of and retention capacity for the grain as the cylinder rotates. The cylinder 130 is thus capable of transporting the grain more quickly through the cylinder/concave section of the combine so as to increase grain processing capacity. The solid cylindrical body 132 of the cylinder 130 prevents grain, soil and plant residue from entering the cylinder and thus eliminates the possibility of the cylinder operating in an out of balance condition. Moreover, the increased mass of the solid cylindrical body 132 of the cylinder 130 over that of prior art cylinders provides the cylinder of the present invention with increased inertia allowing the cylinder to be rotated with less power than previously required. The increased inertia of the solid cylinder 130 of the present invention not only permits the cylinder to be operated more efficiently, but also, by eliminating the possibility of entry of debris into its interior, permits the cylinder to be operated more slowly than previously required. Reducing the rotational speed of the cylinder 130 substantially reduces damage to, or cracking of, the grain caused by high impact forces exerted by a rapidly rotating cylinder upon the grain.

There has thus been shown an improved rotating cylinder for use in separating grain from soil and plant residue in a combine. The cylinder includes a plurality of spaced raspbars around its periphery, to each of which is attached a curved filler plate. Each of the curved filler plates has a concave outer portion and is positioned immediately forward of its associated raspbar in the direction of rotation of the cylinder. With each of the raspbars and filler plates extending substantially the entire length of the cylinder and with each filler plate providing a gap between it and the adjacent raspbar to which it is not coupled, debris is prevented from accumulating within the rotating cylinder and the rotating cylinder is capable of transporting increased amounts of grain. In another embodiment, the cylinder includes a solid cylindrical body which also prevents entry of debris and crop residue into its interior and, because of its increased mass and inertia, permits the cylinder to be rotated with reduced power requirements and at slower speeds. Reducing the rotational displacement rate of the cylinder results in a corresponding reduction in the impact force imposed upon the grain by the rotating cylinder and substantially reduces damage to the grain in the form of cracking.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use with a concave member in a combine for separating grain from the leafy portion of a plant, a cylinder comprising:

a cylindrical-shaped member adapted for rotational displacement about a longitudinal axis thereof and positioned adjacent to the concave member;

a plurality of linear, elongated bars affixed in a spaced manner about the circumference of said cylindrical-shaped member and extending substantially the entire length thereof, wherein each adjacent pair of bars includes a leading and a trailing bar relative to the direction of rotation of said cylindrical-shaped member; and a plurality of filler plates extending substantially the entire length of said cylindrical-shaped member, wherein each of said filler plates is disposed between adjacent bars and is attached to and continuous with its associated trailing bar and extends toward its associated leading bar so as to leave a gap between it and its associated leading bar, and wherein each of said filler plates includes a concave outer portion adapted to receive, engage and transport the grain between said cylindrical-shaped member and the concave member.

2. The cylinder of claim 1 wherein said cylindrical-shaped member includes a plurality of hubs disposed in a spaced manner along the length thereof and an axle coupled to each of said hubs for supporting and allowing the rotational displacement of said hubs.

3. The cylinder of claim 2 wherein each of said hubs includes a plurality of spaced upraised portions around the periphery thereof to which said bars are affixed.

4. The cylinder of claim 3 wherein each of said hubs further includes a plurality of recessed portions each disposed between adjacent upraised portions of each hub and coupled to a respective filler plate.

5. The cylinder of claim 4 wherein each of said recessed portions is concave and is adapted to engage a portion of a filler plater along the length thereof.

6. The cylinder of claim 1 wherein each of said bars includes a leading and a trailing edge relative to the direction of rotation of said cylindrical-shaped member and wherein the leading edge of each bar is positioned closer to the concave member than its trailing edge as the cylindrical-shaped member is rotationally displaced adjacent to the concave member.

7. The cylinder of claim 1 wherein said cylindrical-shaped body and said concave member are disposed relative to one another in an off-center arrangement such that each of said bars moves closer to the concave member as it is rotationally displaced adjacent to the concave member.

8. The cylinder of claim 1 wherein said cylindrical-shaped body comprises a closed cylinder with said bars disposed in a spaced manner around the circular outer surface and extending substantially the entire length thereof.

9. The cylinder of claim 8 wherein said closed cylinder includes a pair of hubs each positioned on a respective end thereof.

10. The cylinder of claim 9 further comprising an axle coupled to each of said hubs to provide support for and facilitate the rotational displacement of said closed cylinder.

11. The cylinder of claim 8 further comprising a plurality of spaced support brackets attached to the circular outer surface of said closed cylinder and coupled to said filler plates to provide support therefor.

12. The cylinder of claim 11 where each of said filler plates includes coupled outer and inner portions and wherein said outer portion is coupled to a support bracket and a bar and an inner portion is concave and is positioned in contact with the circular outer surface of said closed cylinder.

13. The cylinder of claim 12 wherein the inner portion of each of said filler plates is positioned forward of the outer portion thereof as said closed cylinder is rotationally displaced.

14. The cylinder of claim 8 wherein a leading edge of each of said bars is positioned closer to the concave member than a trailing edge of said bar as said closed cylinder is rotationally displaced.

15. The cylinder of claim 8 wherein said solid cylinder and the concave member are arranged in an off-center manner relative to each other such that each of said bars is displaced toward the concave member as they are rotationally displaced adjacent to the concave member.

* * * * *